(12) United States Patent
Haas et al.

(10) Patent No.: US 7,035,937 B2
(45) Date of Patent: Apr. 25, 2006

(54) INDEPENDENT-TREE AD HOC MULTICAST ROUTING

(75) Inventors: Zygmunt J. Haas, Summit, NJ (US); S. Sajama, La Jolla, CA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 479 days.

(21) Appl. No.: 10/120,190

(22) Filed: Apr. 11, 2002

(65) Prior Publication Data

US 2003/0005149 A1 Jan. 2, 2003

Related U.S. Application Data

(60) Provisional application No. 60/286,491, filed on Apr. 25, 2001.

(51) Int. Cl.
*G06F 15/173* (2006.01)

(52) U.S. Cl. .................. 709/239; 709/238; 370/238

(58) Field of Classification Search ........ 709/238–239, 709/227–228; 379/227–228; 370/238, 216; 714/47
See application file for complete search history.

(56) References Cited

U.S. PATENT DOCUMENTS

| | | | |
|---|---|---|---|
| 6,321,270 B1 * | 11/2001 | Crawley ................. | 709/238 |
| 6,721,290 B1 * | 4/2004 | Kondylis et al. ........ | 370/329 |
| 6,728,205 B1 * | 4/2004 | Finn et al. .............. | 370/217 |
| 6,732,189 B1 * | 5/2004 | Novaes ................... | 709/249 |
| 6,791,981 B1 * | 9/2004 | Novaes ................... | 370/390 |
| 2001/0034793 A1 * | 10/2001 | Madruga et al. ........ | 709/238 |
| 2003/0193958 A1 * | 10/2003 | Narayanan .............. | 370/400 |

OTHER PUBLICATIONS

Ahmed et al, "A Collaborative Multicast Routing (CMR) Protocol for Hybrid Wireless Networks," HRL Laboratories, LLC. (Malibu, CA), pp. 1-9.
Vaishampayan et al, "Efficient and Robust Multicast Routing in Mobile Ad Hoc Networks," IEEE, 2004.
Ganguli et al, "An Improvement of ODMRP for Reliable Delivery of Busty Traffic," IEEE, p. 5 pages.
Cooper, D.E. et al, "High Coverage Multicasting for Mobile Ad-hoc Networks," School of Computing Science, University of Newcastle, pp. 1-12.

(Continued)

*Primary Examiner*—Abdullahi E. Salad
(74) *Attorney, Agent, or Firm*—Jones, Tullar & Cooper, P.C.

(57) ABSTRACT

A routing protocol for a multicasting network, such as an ad hoc network, employs alternate tree or path computation algorithms that continually compute backup trees or paths that can be employed to replace failed trees or paths. The sets of alternate multicast trees or paths are preferably pre-calculated before a first tree or path fails to minimize delay in replacing a failed tree or path. Preferably, the algorithms are designed to compute the alternate multicast trees or paths in such a manner that they are maximally independent of the original set of trees and paths to minimize correlation between the original trees or paths and the replacement trees or paths and to possibly increase the useful time of the calculated trees. This helps insure that the replacement trees or paths will not be likely themselves to fail soon after failure of the original trees or paths.

11 Claims, 3 Drawing Sheets

OTHER PUBLICATIONS

Wang, B. et al, "Adaptive Technique for Tree-based Multicasting in Wireless Ad Hoc Networks," Department of Computer Science & Engineering, pp. 1-30.

Palanisamy, "Multicast Applications for Mobile Ad-Hoc Networks," Department of Computer Science & Engineering, pp. 1-11.

Wang et al, "Source-based Energy-Efficient Multicasting in Wireless Ad Hoc Networks," Department of Computer Science & Engineering, Arizona State University, pp. 1-32.

Liang, "Constructing Minimum-Energy Broadcast Trees In Wireless Ad Hoc Networks," Department of Computer Science, The Australian National University, pp. 112-122.

Wieselthier et al, "Algorithms for Energy-Efficient Multicasting in Static Ad Hoc Wireless Networks," Mobile Networks & Applications, 2001, pp. 251-263.

Yasinsac et al, "Modeling Protocols for Secure Group Communication in Ad Hoc Networks," Computer Science Department, Florida State University, pp. 1-10.

Li et al, "Broadcasting and Topology Control In Wireless Ad Hoc Networks," Department of Computer Science, Illinois Inst. of Tech., pp. 1-27.

Bur et al, "Multicast Routing for Ad Hoc Networks with a Multiclass Scheme for Quality Service," NETLAB, Dept. of Computer Engineering Bogazici University, pp. 10 pages.

Bakht, et al, "Multicasting in Mobile Ad-Hoc Networks," School of Computing & Mathematical Sciences, Liverpool John Moores University, p. 6 pages.

Kindylis, et al, "Multicasting Sustained CBR and VBR Traffic in Wireless Ad-Hoc Networks," HRL Laboratories, pp. 1-7.

Gui et al, "Scalable Multicasting in Mobile Ad Hoc Networks," IEEE, 2004, pp. 11 pages.

Kunz et al, "Multicasting in Ad-Hoc Networks: Comparing MAODV and ODMRP," Carleton University, pp. 11 pages.

Madruga, E., "Multicasting in Ad-Hoc Networks," A dissertation submitted in partial satisfaction of the requirements for the degree of Doctor of Philosophy, University of California, Santa Cruz, Sep. 2002, p. 145 pages.

Mudruga et al, "Scalable Multicasting: The Core-Assisted Mesh Protocol," Computer Engineering Department, University of California, pp. 1-19.

Lee, et al, "A Performance Comparison Study of Ad Hoc Wireless Multicast Protocols," Computer Science Department, University of California, pp. 10 pages.

Ge, et al, "Overlay Multicasting for Ad Hoc Networks," Department of Computer Science & Engineering, University of California, pp. 131-143.

Mavinkurve, et al, "MIP3S: Algorithms for Power-Conserving Multicasting in Static Wireless Ad Hoc Networks," Computer Science & Engineering Dept., State University of New York at Buffalo, p. 6 pages.

Vaishampayan, et al, "Roust Tree-based Multicasting in Ad hoc Networks," Department of Computer Science, University of California Santa Cruz, p. 6 pages.

Girici et al, "Multicasting of Connectionless Traffic in Resource—Limited Ad Hoc Wireless Networks," Dept. of Electrical & Computer Eng., University of Maryland at College Park, p. 5 pages.

O'Neill et al, "Optimal Routes and Flows in Multicasting over Ad Hoc Networks," Department of Electrical Engineering, Stanford Universty, pp. 1-5.

Gui et al, "Scalable Multicasting in Mobile Ad Hoc Networks," IEEE, 2004, p. 11 pages.

* cited by examiner

INDEPENDENT-TREE AD HOC MULTICAST ROUTING

PRIORITY CLAIM UNDER 35 U.S.C. § 119(e)

This application claims priority, under 35 U.S.C. § 119(e), on U.S. Provisional Application No. 60/286,491, filed Apr. 25, 2001.

GOVERNMENT RIGHTS STATEMENT

This invention was made with Government support from the National Science Foundation (NSF) under Grant No. 9980521, the Office of Naval Research (ONR) under Grant No. N00014-00-1-0564 and the AFRL under contract No. F30602-97-C-0133. The Government has certain rights in the invention.

BACKGROUND OF THE INVENTION

1. Field of the Invention

The present invention relates in general to a method and system for multicasting communications using routing schemes in which multiple independent trees or paths are employed to minimize communications interruptions due to tree or path failures. The invention is particularly suited for use in ad hoc networks.

2. Description of the Background Art

An ad hoc network consists of a collection of mobile routers that are interconnected via wireless links and are free to move about arbitrarily. This technology has its roots in DARPA packet radio networks. Research on multi hop packet-switching radio networks started in the 1970s, with its initial motivation in military applications. Their attractiveness was (and continues to be) because of the ease and speed of deployment in hard-to-access environments. In recent years, interest in ad hoc networks has grown with improvements in laptop computers including greater computational power, longer battery life and decreased weight. Advent of ubiquitous computing and the proliferation of portable computing devices have further increased the importance of efficient routing in mobile networks.

One of the most pressing needs for enhanced communication protocols come from multi point applications, which involve the one-to-many communication model (i.e., multicasting operation). Such applications cover a very wide spectrum including software distribution, replicated database update, command and control systems, audio/video conferencing, and distributed interactive simulation.

Multicasting is an efficient communication tool for use in multi point applications. Many of the proposed multicast routing protocols, both for the Internet and for ad hoc networks, construct trees over which information is transmitted. Using trees is evidently more efficient than the brute force approach of sending the same information from the source individually to each of the receivers. Another benefit of using trees is that routing decisions at the intermediate nodes become very simple: a router in a multicast tree that receives a multicast packet over an in-tree interface forwards the packet over the rest of its in-tree interfaces.

Multicast routing algorithms in the Internet can be classified into three broad categories: Shortest Path Tree algorithms, Minimum Cost Tree algorithms, and Constrained Tree algorithms. There are two fundamental approaches in designing multicast routing—one is to minimize the distance (or cost) from the sender to each receiver individually (shortest path tree algorithms) and the other is to minimize the overall (total) cost of the multicast tree. Practical considerations lead to a third category of algorithms which try to optimize both constraints using some metric (minimum cost trees with constrained delays). The majority of multicast routing protocols in the Internet are based on shortest path trees, because of their ease of implementation. Also, they provide minimum delay from sender to receiver, which is desirable for many real-life multicast applications. However shared trees are used in some more recent protocols (like PIM and CBT) in order to minimize states stored in the routers.

Multicasting in ad hoc networks is more challenging than in the Internet, because of the need to optimize the use of several resources simultaneously. Firstly, nodes in ad hoc networks are battery-power limited. Furthermore, data travels over the air and wireless resources are scarce. Secondly, there is no centralized access point or existing infrastructure (like in the cellular network) to keep track of the node mobility. Thirdly, the status of communication links between routers is a function of their positions, transmission power levels, etc. The mobility of routers and randomness of other connectivity factors lead to a network with a potentially unpredictable and rapidly changing topology. This means that by the time a reasonable amount of information about the topology of the network is collected and a tree is computed, there may be very little time before this computed tree becomes useless.

Work on multicast routing in ad hoc networks gained momentum in the mid 1990s. Some early approaches to provide multicast support in ad hoc networks, such as for example, Shared Tree Wireless Network Multicast, consisted of adapting the existing Internet multicasting protocols. Other protocols, such as On-Demand Multicast Routing Protocol (ODMRP) have been designed specifically for ad hoc networks. ODMRP is a mesh based, on-demand protocol that uses a soft state approach for maintenance of the message transmission structure. It exploits robustness of mesh structure to frequent route failure and gains stability at the expense of bandwidth. The Core Assisted Mesh Protocol (CAMP) attempts to remedy this excessive overhead, while still using a mesh by using a core for route discovery. AMRIS is a protocol that constructs a shared delivery tree rooted at a node, with ID-numbers increasing as they radiate from the source. Local route recovery is made possible due to this property of ID numbers, hence reducing the route recovery time and also confining route recovery traffic to the region of link failures.

One common characteristic of most of these approaches is that they react to a link failure, i.e. they act after a link has already failed, causing a significant delay in route recovery. As a result, communications between selected nodes in the network can be disabled for a significant period of time. A need therefore exists for a multicasting routing protocol that can minimize the time period between failure of a link and route recovery.

SUMMARY OF THE INVENTION

The present invention fulfills the foregoing need through use of a routing protocol or scheme that can be employed to replace failed links and nodes in a multicasting network virtually as soon as they occur. To achieve this functionality, the routing protocol continuously computes alternate routing trees or paths that can be used to facilitate communications among a plurality of nodes in the network. The alternate trees or paths are computed even before a failure in a link or node in the network occurs. As a result, the alternate trees or paths can immediately be employed in place of the original set of trees or path upon occurrence of a node or link failure, thereby minimizing duration of any interruptions in communications between the nodes.

Preferably, the invention can be implemented using a number of techniques, the following two of which are examples. The most preferred technique is to calculate multiple backup paths that can be employed to replace failed portions or segments of a tree. The use of backup paths is preferred since it avoids the necessity of replacing the whole tree when only a small portion thereof has failed. Preferably, an algorithm is employed to implement this technique that computes trees such that paths to each receiver in these trees are disjoint while allowing paths to different receivers to overlap within trees. Using the algorithm, one starts off with a tree and then for each receiver, has a set of backup paths that are maximally disjoint from one another and from the path to the receiver in the first tree.

The second technique for implementing the invention is to calculate sets of alternate trees, which can be used whenever a presently employed tree fails. Preferably, the alternate trees are maximally independent (i.e., have a minimum number of common nodes and links) of the original set of trees to minimize correlation between the original trees and the alternate trees. This helps insure that the nodes and links in the alternate trees that are employed to replace the original trees will not be likely to fail themselves soon after their implementation in the network. Various algorithms can be employed to calculate the backup trees in such a manner that the trees are maximally independent of one another without being so independent that the backup trees contain an excessive number of links, which themselves, would increase the likelihood of tree failure. The independence of the sets of trees also improves the mean time between route discovery cycles for a given interruption rate and hence reduces the control overhead and the rate of data loss.

Once a set of backup paths or trees is computed using the aforementioned or other techniques and the network starts multicasting, it is necessary to replenish the backup path or tree set in such a way as to maintain some quality of service, i.e., to maintain the probability of interruptions below some threshold. This means that new backup paths or trees need to be computed by the time the probability of failure of the current set of paths or trees rises above a given threshold. Thus, in the preferred embodiments, an estimate of the time at which the probability of failure of a current set of trees or paths therein exceeds a threshold is made. Using this time estimate, in conjunction with knowledge of how long it takes to discover a new route and how long it then takes to compute a set of alternate backup trees or paths, the time at which calculation of a new set of backup trees or paths should begin can be determined. Using this technique, the probability of interruption to multicast communication is not allowed to rise above a certain threshold, hence maintaining the desired quality of service.

Through use of the present invention, the efficiency of multicasting networks is substantially improved. When a network is reasonably stable, like the Internet, the gain in efficiency due to multicasting (when compared to flooding) more than offsets the cost of route discovery and maintenance. However, as the average velocity of nodes increases, so does the cost of route discovery and maintenance. This means that for any mobility pattern, there is an average velocity of nodes beyond which multicasting is no longer efficient when compared to flooding. This velocity is much higher for the protocol of the present invention when compared to other tree-based schemes because of use of the backup trees and paths. The cost of the multicast tree is optimized along with minimizing the mutual correlation of failure times of each pair of trees under the constraints of partial knowledge of the network.

BRIEF DESCRIPTION OF THE DRAWINGS

The features and advantages of the present invention will become apparent form the following detailed description of a number of preferred embodiments thereof, taken in conjunction with the accompanying drawings, in which.

DETAILED DESCRIPTION OF THE PREFERRED EMBODIMENTS

1. Exemplary Network

Figure 1:
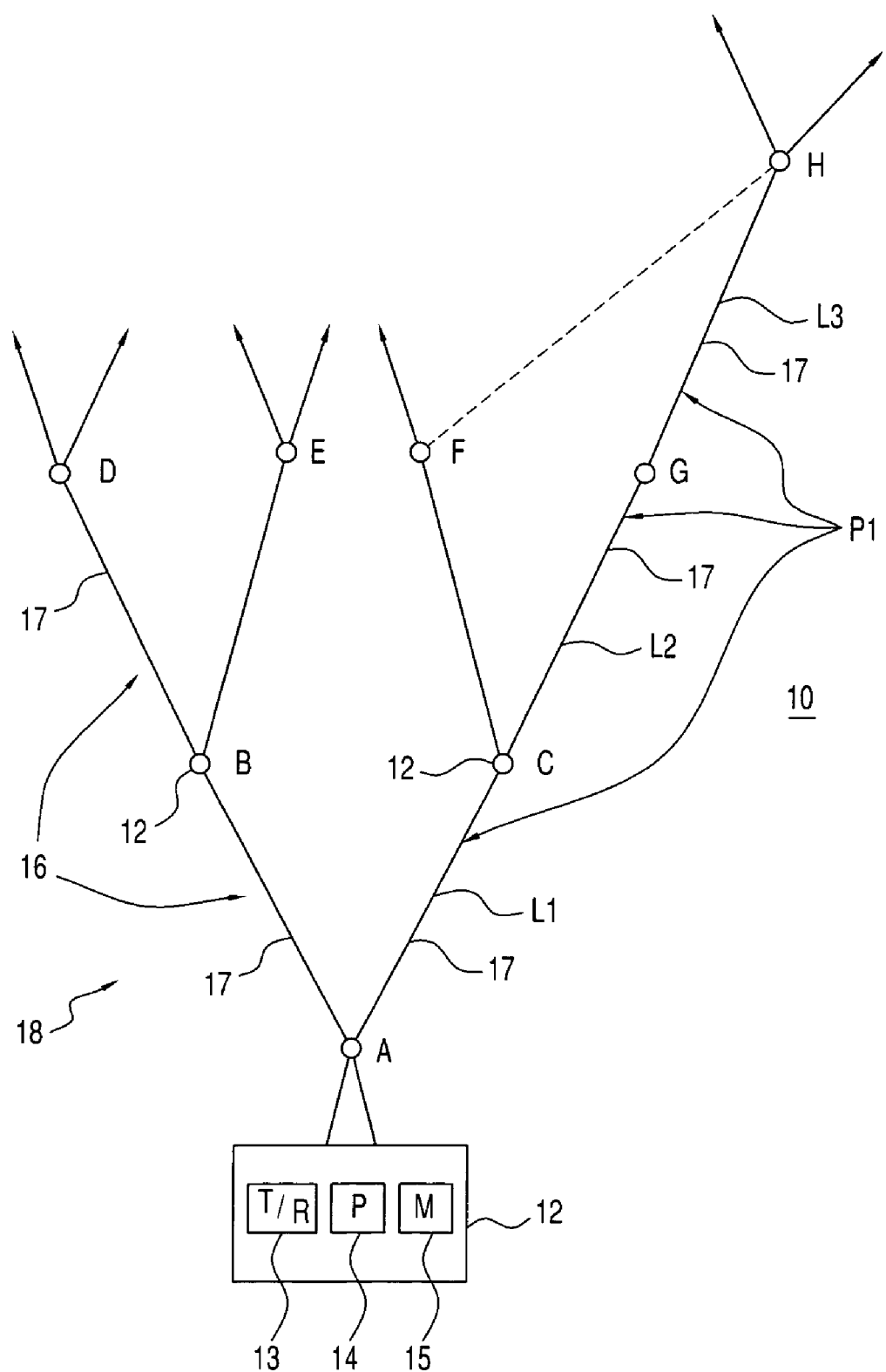
FIG. 1 is a block diagram of an example of an ad hoc network that can be configured to operate in accordance with the principles of the present invention.

With reference to FIG. 1, an ad hoc network 10 is illustrated that can be configured to operate in accordance with the principles of the present invention. While the invention is particularly suited for use with ad hoc networks, it should be understood that the invention could be employed in any type of communications network that employs multicasting routing protocols. The network 10 includes a plurality of communications nodes 12, many or all of which can be portable and mobile. As an example, the nodes 12 can be associated with military vehicles or personnel in the field. As is conventional, each node 12 includes a transceiver 13 for transmitting and receiving communications to and from the other nodes 12 in the network 10. In addition, each node 12 includes a processor 14 for processing information requests from other nodes, managing node routing and location information, performing route discovery and calculating routing trees and paths in accordance with the embodiments of the present invention. A memory 15 is also interfaced to the processor 14 for storing a database of node location and route information for all other nodes in the network 10, as well as for storing routing tree and path sets.

In a multicasting routing protocol, when one node in a network receives a message from another node to be passed onto other nodes, the receiving node will send the message to one or more of the other nodes in the network in accordance with the routing tree or scheme being employed by the network at the time. As an example, a number of the nodes 12 in the network 10 have been lettered A through H to illustrate the multicasting process. Suppose node A wants to send a message to node H. Now, assume that in the sample network 10, each of the nodes 12 multicasts messages to two other of the nodes 12 in the network 10. Under this scheme, node A sends the message destined for node H to nodes B and C. In response, nodes B and C pass the message to nodes D and E, and F and G, respectively. These four nodes then pass the message to more of the nodes 12, including node H, which receives the message from node G. In this manner, each of the nodes 12 is linked to one another via a plurality of paths 16, each formed of one or more transmission links 17. Collectively, the paths 16 make up a routing tree 18 that interconnects the nodes 12 (note that the term "edge" is also used to refer to a link between adjacent nodes in the analysis that follows). The links labeled L1–L3 form a path P1 that interconnects node A with node H.

Now, consider the situation where either one of the links 17 fails, as may occur if two of the nodes become too far apart, or one or more of the nodes 12 fails. For example, if node G fails, node A can no longer communicate with node H. It then becomes necessary for node A to reconfigure the routing tree 18 or paths 16 therein to bypass the node G, so that, for example, node F now sends messages to node H. This procedure, however, takes time in using algorithms to recompute the network trees or paths.

The present invention overcomes the drawbacks of previous routing schemes by programming each of the processors 14 in the nodes 12 to calculate backup trees and paths on a continuous basis, even when no link or node failure has occurred, so that multiple alternate trees or paths are available when a link or node failure does occur. As a result, these alternate trees or paths can be immediately employed to minimize communications interruptions. In addition, the backup trees and paths are preferably computed using algorithms that insure a selected maximal level of independence of the backup trees or paths relative to the original trees and paths. The basic idea is that if one is able to compute multiple backup multicast trees with minimal overlap, the backup trees could be used one after another to reduce the number of service interruptions. This would also improve the mean time between route discovery cycles for a given interruption rate and hence reduce the control overhead and the rate of data loss. At the same time, there are competing concerns that need to be addressed. In particular, the cost of transmission needs to be kept low, while the mobility of ad hoc networks requires that very little time be used for tree computation and hence it is important that the route discovery algorithms be of low complexity.

2. Dependence of a Set of Trees

This method of using one tree after another will be effective if the trees to be used as backup last for a significant amount of time after the previous trees fail. This means that the failure times of the trees should be independent of one another. If it is assumed that nodes move independently of one another, having no common nodes (and hence no common links or edges) would make the trees fail independently of one another.

However, in the case of ad hoc networks, where the average degree of a node is not high, one would expect not to find completely independent trees in many cases. Hence the present invention employs schemes that concentrate on minimizing the dependence between the failure times. The dependence of a pair of trees is defined as the correlation of the failure times of the two trees. Given a pair of trees, their dependence depends on the structure of each of the trees apart from the number of common nodes and edges.

Dependence of a pair of trees is a complicated function of the mobility pattern of the nodes. Hence a practical way to compute independent enough trees would be to discourage common edges and nodes among the trees. Intuition suggests that having a common edge is much worse (causes more dependence in a pair of trees) than having a common node. However, a probabilistic analysis was conducted to find the correlation of the failure times of two edges sharing a common node. This analysis established that under certain conditions, such as when the nodes in the network have velocities that are uniformly distributed over a selected range, the correlation between the failure times of two adjacent links was more than a trivial amount. Hence, under this kind of mobility pattern, it is important to minimize common nodes between trees in addition to minimizing common edges, in order to keep the failure times as independent as possible.

3. Tradeoff Between Dependence and the Total Time for Which the set Of Trees Last The total time for which a system lasts depends on the individual failure times of the trees used and their independence. If a tree has greater number of links, it is likely to fail faster. On the other hand, if trees have to be maximally independent, they might be less efficient and contain more links, as compared with the case in which some overlap is allowed. Hence the trees should not be so independent as to make them fail very fast and hence reduce the total system time.

4. Mechanism to Replace Trees

Once a set of backup trees is computed and the network starts multicasting, it is necessary to replenish the backup tree set in such a way as to maintain some quality of service, i.e., to maintain the probability of interruptions below some threshold. This means that new trees need to be computed by the time the probability of failure of the current set of trees rises above a given threshold. If a sender node has an estimate of the time when this will happen, it could initiate route discovery at such a time, T, as to allow for the route discovery and tree computation to be completed in time. One way to estimate T given a mobility pattern of nodes follows.

It is possible to compute the probability of interruption occurring before a given time after a given route discovery cycle (or failure of first n trees) if one has knowledge of the mobility pattern of the nodes. If the threshold for probability is too high, the scheme will resemble a link state multicast protocol, thus initiating the route discovery process too often, while if it is too low it will be reactive, possibly causing service disruption.

Let the average time for route discovery be $T_{RD}$ and let the average time for computing the set of n trees for a multicast group size m be $T_{m,n}$. Let $F_{n,m}(p)$ be the time, since failure of the first n trees, at which the probability that all remaining trees will fail increases above p (finding this function is illustrated in the simulation results section on tree replacement). Let $P_T$ be the threshold below which the probability of failure is to be kept at all times.

Initially, the estimate of T is $T=F_{0,m}(P_T)-T_{RD}-T_{m,n}$. At the time when the n-th tree fails, the estimate of T is updated to:

$$T=F_{n,m}(P_T)-T_{RD}-T_{m,n}$$

At the time T after the most recent tree failure (or previous route discovery if no tree has failed since then), another cycle of route discovery should be started. If at the time of failure of the n-th tree, T is estimated to be negative, a new route discovery cycle should be started immediately. Thus the probability of interruption to multicast communication is not allowed to rise above $P_T$, hence maintaining the desired quality of service.

5. Incorporating the Invention into Existing Routing Protocols

The concepts of the present invention can be easily implemented on top of a suitable unicast layer, which provides route discovery. For example, consider the Dynamic Source Routing (DSR) protocol, a unicast protocol for ad hoc networks. In this protocol, in response to a single route discovery (as well as through routing information from other packets overheard), a node may learn and cache multiple routes to any destination. This way when one of the edges fails, the sender uses another cached route. Using "Diversity Injection" can increase knowledge of network obtained from route discovery. Also, once the sender discovers edges to all receivers, one of the proposed algorithms can be used to compute and maintain several multicast backup trees. The mechanism required to switch between trees in the event of link failure is already available in DSR.

6. Network Model

An ad hoc network like the network 10 of FIG. 1 can be represented via a graph (V,E), where V is the set of nodes and E is the set of edges. The network is assumed to be two-dimensional and the mobile hosts (transceivers) are represented by nodes of the graph. An edge or link between any two nodes is present whenever the two nodes are able to communicate directly with one another. The total number of edges in the graph is denoted by L, i.e., $L=\cup E$, and the sender node is denoted by O (which stands for origin of the data). $V1 \subseteq V$ is the set of nodes in the multicast receiver group.

It is assumed that O has some knowledge of the graph topology from route discovery. E2 is the set of all edges in the graph that exist according to O's current view of the network. (V2, E2) are the nodes and edges that belong to all these edges. The goal of the protocol is to find methods for computing a set of trees {T1, T2, T3 . . . } from O to {V1} in this graph G=(V2, E2), while minimizing the dependence of their failure times. As is usually the case with multicast trees, T1 and T2 are directed (though the links of the graph are assumed to be bi-directional); i.e., associated with each link i there is a node at which the link begins $O_1$ and a node at which it ends $D_1$, which stand for origin and destination of each link.

In the schemes described below, the set of all edges in the graph, along with a quantity called the cost of each edge, is called the cost function of the graph. The known Dijkstra algorithm is extensively used, which takes the cost function and incidence matrix of the graph as input and computes the shortest edge tree from a given source to the given set of receivers.

7. Schemes for Computing Maximally Independent Trees

As explained before, one goal of the alternate tree embodiments of the present invention is to develop schemes to efficiently compute a set of trees, whose failure times are minimally correlated. Under the assumption that mobility of a node is independent of other nodes, this condition translates to the trees having minimum number of common nodes and edges, with common edges being more undesirable than common nodes.

Two possible ways of using the backup tree set in the event of a link failure: 1) replace the whole tree being used currently by a backup tree, if available or 2) determine which of the nodes are disconnected because of this link failure and replace or augment the links or edges to those nodes by backup links or edges.

7.1. Computing Backup Trees

Numerous algorithms can be employed to calculate backup trees or paths. Three specific techniques of finding sets of disjoint multicasting trees from a sender node to a group of receiving nodes have been studied. However, it will be understood that these techniques are exemplary and that the invention is not limited to the use of these techniques. In the discussions that follow, the trees to be found are referred to as T1, T2 and so on. T1 is intended to be used at the start and the others are to be used as backup.

7.1.1 Matroid Intersection Heuristic

The Matroid Intersection algorithm is a known algorithm that can be applied in a first embodiment of the present invention to find two maximally independent spanning trees on any given graph (i.e., spanning trees with a minimum possible number of common edges) such that the total cost of the two spanning trees is minimized. The two spanning trees obtained are called J1 and J2. Given a sender (call it the source node) and a set of receivers, two multicasting trees T1 and T2 are obtained on graphs J1 and J2, respectively, using the Dijkstra algorithm.

Matroids and Spanning Trees

Let E be a finite set and I be a family of subsets of E, called "Independent" sets. A subset system M=(E, I) (a finite set E together with a collection I of subsets of E) is called a matroid if the following axioms are satisfied:

1) $0 \in I$
2) if $J' \subseteq J \in I$, then; $J' \in I$
3) for every $A \subseteq E$, every maximal independent subset of A has the same cardinality.

EXAMPLE 1

E1=Set of all edges in a graph G and I is the family of subsets of E satisfying the condition that none of them contains a circuit of the graph. Hence independent subsets of this graph are all subsets of trees on this graph.

EXAMPLE 2

E=Set of all edges in graphs G and G' (see FIG. 2) where G' is a copy of G (edge $e'_1$ is a copy of $e_1$ and so on). Two matroids which can be defined on this set are:

$M_1=(E, I_1)$ where an "independent" set is a union of subsets of trees of G and G'. For example, an independent set in the collection $I_1$, could be $\{e_1, e_2, e_3, e_4, e'_5, e'_6, e'_7, e'_2\}$ and a set which would not belong to $I_2$ would be $\{e_1, e_2, e_7, e'_8\}$ since it has a circuit in it.}

$M_2=(E, I_2)$ where an "independent" set is one which does not have both copies of any of the edges. An example of an independent set in $I_2$ would be $\{e_1, e'_3, e'_7\}$ and a set which would not belong to $I_2$ would be $\{e_1, e'_3, e'_1\}$ since it contains both copies of $e_1$.

Hence if a subset of E belongs to both Matroids defined above, it will have to be a union of 2 trees, one in G and the other in G'. Moreover, the copy of an edge that belongs to the tree in G should not belong to the tree in G'. This observation indicates that when 2 edge disjoint trees are possible in a graph G, the set belonging to both the collections $I_1$ and $I_2$ and having the maximum possible cardinality will be the union of two disjoint spanning trees. Hence the problem of finding two independent forests in the graph can be thought of as finding a maximum cardinality common independent set of the two matroids defined above.

The Matroid Intersection Algorithm (MIA)

In this algorithm, start with a set J which belongs to both $I_1$ and $I_2$, say the empty set (Refer to Example 2 above for meaning of $I_1$ and $I_2$).

Then, repeatedly increase the size of J with the help of an auxiliary directed graph $G=G(M_1, M_2, J, w^1, w^2)$ constructed using some rules. $w^1$ and $w^2$ is a weight splitting (obtained from weight splitting in the previous step using rules described in the algorithm and starting with $w^1=w$ and $w^2=0$). G has a node set $E \cup \{r, s\}$ and arcs:

es for every $e \in E \setminus J$ such that $J \cup \{e\} \in I_1$;
re for every $e \in E \setminus J$ such that $J \cup \{e\} \in I_2$;
ef for every $e \in E \setminus J$, $f \in J$ such that $J \cup \{e\} \notin I_1$, $(J \cup \{e\}) \setminus \{f\} \in I_1$;
fe for every $e \in E \setminus J$, $f \in J$ such that $J \cup \{e\} \notin I_2$, $(J \cup \{e\}) \setminus \{f\} \in I_2$;

The costs of arcs of G, $p_{uv}$, are defined by ($ci_0$ denotes $\max\{w^1_e : e \notin J, J \cup \{e\} \in I_1\}$);

$p_{es} = w^1_0 - w^1_e$ for each M1 arc es with:$e \notin J$;
$p_{es} = w^2_0 - w^2_e$ for each M2 arc re with:$e \notin J$;
$p_{es} = -w^1_e + w^1_f$ for each M1 arc ef with:$e \notin J$ and, $f \in J$;
$p_{es} = -w^2_e + w^2_f$ for each M1 arc ef with:$e \notin J$ and, $f \in J$.

If there exists an (r, s) dipath in G, then J is not maximum; in fact, if r, e1, f1, ... em, fm, em+1, s is the node sequence of a chordless (r, s)-dipath, then $J \Delta \{e1, f1, \ldots em, fm, em+1\}$ in $I_1 \cup I_2$. If there exists no (r, s) dipath in G, then J is a maximum. $J < \{e1, f1, \ldots, em, fm, em+1\}$ is defined as $J \cup \{e_1\} \setminus \{f_1\} \ldots \setminus \{f\} \cup e_{m+1}$.

Weighted Matroid Intersection Algorithm

```
Set k = 0;
Set J_K = 0;
Let w¹ = w, w² = 0;
While J_K is neither M1-basis nor an M2-basis
{
    Construct G(M1, M2, J_K, w¹, w²);
    Find least weight directed edge from r to v in G of cost d_v for each v
    For all v ∈ E, let σ_v = min(d_v, d_s) and replace w¹_v by w¹_v - σ_v,
    w²_v by w²_v - σ_v. Construct G(M1, M2, J_K, w¹, w²);
    If there is an (r,s)-dipath in G
    {
        Find a least weight (r,s) dipath P having as few arcs as possible;
        Augment J_K on P to obtain J_{K+1};
        Replace k by k+1
    }
    else
        {Choose J = J_P and stop.}
}
```

In the above algorithm, Dijkstra's algorithm could be used to find the minimum weight edges.

Maximal Vs Maximum

When it is not possible to have 2 completely edge-disjoint spanning trees, the above algorithm gives 2 trees edge disjoint trees with maximal cardinality (These might not be spanning trees as adding any more edges might require overlap between the 2 trees). Hence now to complete each tree, the links in the other tree are arranged in ascending order of their costs and links are added to the first tree (unless they form circuits) until the first tree is complete and vice versa. Note that multicast trees generated in this way may not have minimum possible number of common edges, though the spanning trees do have this property. Also, note that this scheme can be used only to obtain one backup tree, because the problem of finding the intersection of 3 Matroids is too difficult.

EXAMPLE

Figure 2:
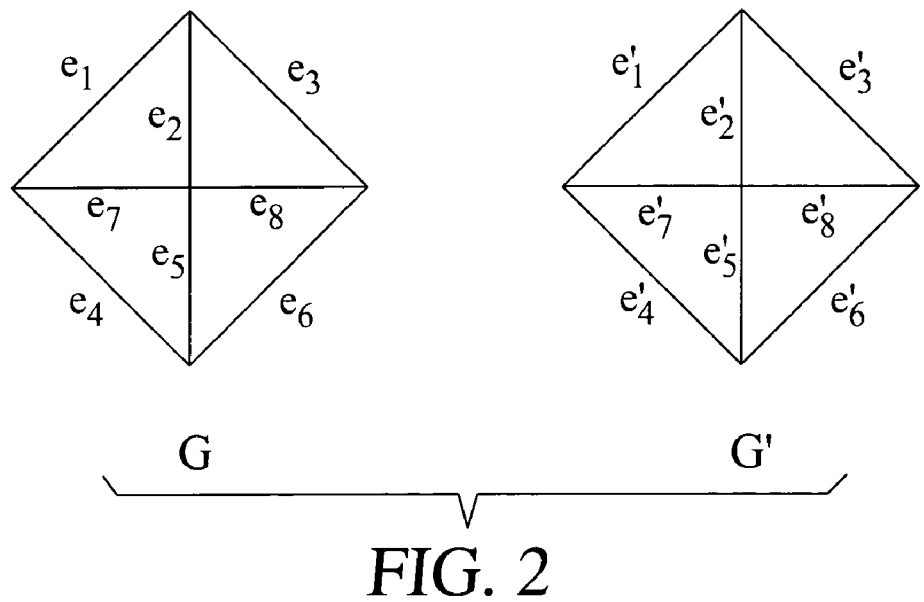
FIG. 2 is a graphical representation of an ad hoc network showing a group of communications nodes connected by a group of edges that represent communications links.

Consider the graph G in FIG. 2. The problem is to find two disjoint spanning trees. First, it needs to be verified that this is possible. This is easily done by trying different combinations of 4 edges each; four edges are needed to form a tree for a graph with 4 nodes. One example would be $\{e_1, e_3, e_5, e_7\}$ and $\{e_2, e_4, e_6, e_8\}$.

Figure 4:
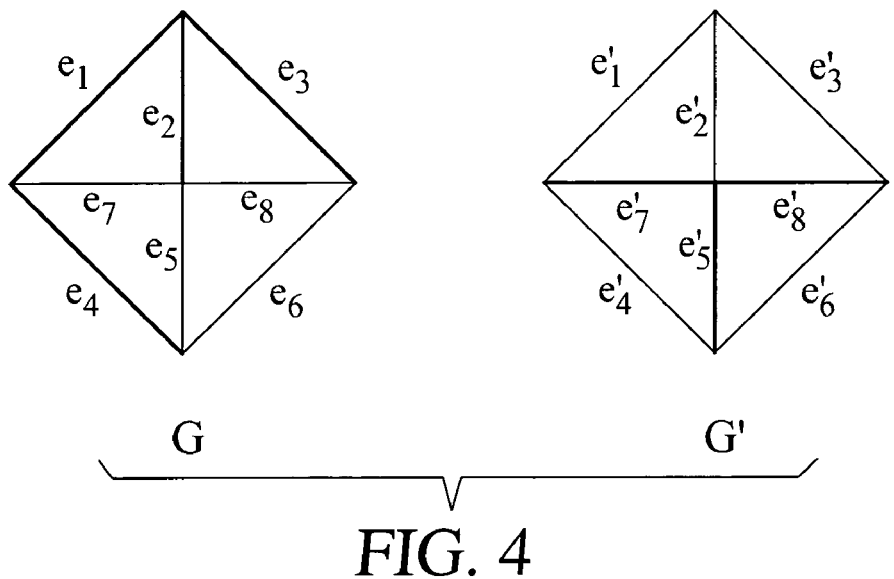
FIG. 4 is a graph illustrating two non-maximal trees that are obtained through simple enumeration.

The effectiveness of arriving at a pair of disjoint trees using the Matroid Intersection Algorithm can be seen by going through the process for this simple graph. Suppose one starts by building just a tree $T_1$ first and then removing links of $T_1$ from the set of edges and then trying to build another tree $T_2$. The following two sets would be obtained (see FIG. 4):

$T_1 = \{e_1, e_2, e_3, e_4\}$
$T_2 = \{e_5, e_6, e_7\}$

Adding $e'_8$ to $T_2$ will create a circuit and hence is not acceptable. Now one would like to move some edges from $T_1$ to $T_2$ and add some new ones to $T_1$, so that it still remains a tree.

Figure 3:
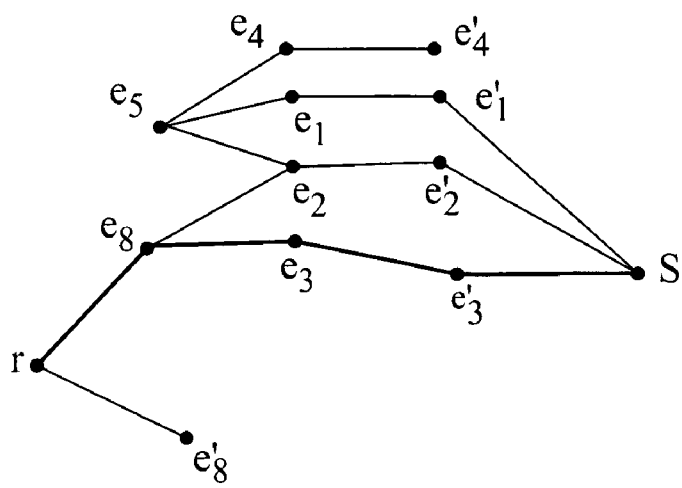
FIG. 3 is a portion of a sample auxiliary digraph, which illustrates edges of the graph of FIG. 1 that are to be removed and added to form an alternate tree in accordance with one embodiment of the invention.
Figure 5:
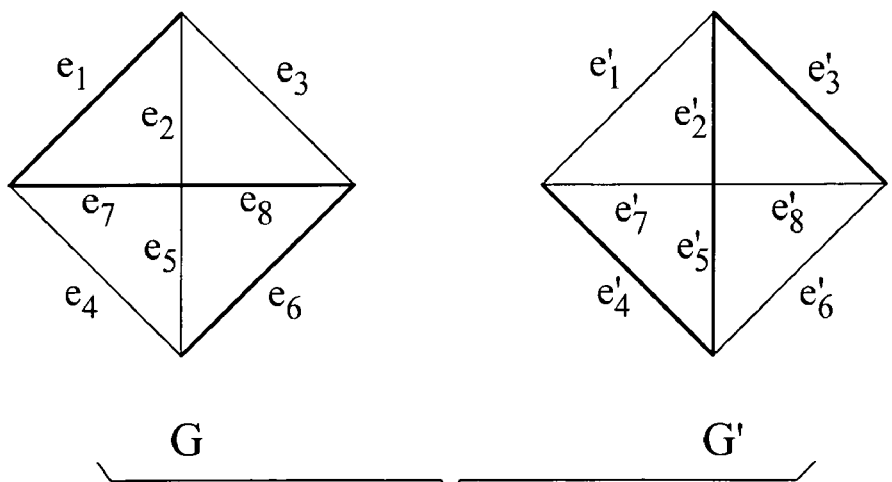
FIG. 5 is a graph illustrating a pair of spanning trees that are calculated in one preferred embodiment using the Matroid Intersection algorithm.

Constructing an auxiliary digraph G' (see FIG. 3) helps find the edges which are to be removed and those which are to be added. In the terminology used above:

$E = \{e_1, \ldots, e_8, e'_1, \ldots, e'_8\}$
Current $J = \{e_1, e_2, e_3, e_4, e'_5, e'_6, e'_7\}$
G has the node set $E \cup \{r, s\} . e \in S \setminus J$ and $f \in J$.
Its edges are:

from rule 1, edges of the form es:$e'_1S$, $e'_2S$, $e'_3S$ since $e'_1$, $e'_2$ and $e'_3$ combined with $T_2$ form a tree, i.e., $J \cup \{e\} \in I_1$;
from rule 2, edges of the form re :$re'_8$, $re_8$; $J \cup \{e\} \in I_2$;
from rule 3, edges of the form ef :$e_5e_4$, $e_5e_1$, $e_5e_2$, $e_6e_1$, $e_6e_3$, $e_6e_4$, $e_7e_1$, $e_7e_2$, $e_8e_2$, $e_8e_3$, $e'_4e'_5$, $e'_4e'_7$, $e'_8e'_5$, $e'_8e'_6$; $J \cup \{e\} \notin I_1$, $(J \cup \{e\}) \setminus \{f\} \in I_1$;
from rule 4, edges of the form fe: $e_1e'_1$, $e_2e'_2$, $e_3e'_3$, $e_4e'_4$, $e'_5e'_5$, $e'_6e_6$, $e'_7e_7$, $J \cup \{e\} \notin I_2$, $(J \cup \{e\}) \setminus \{f\} \in I_2$;

Now, an rs dipath needs to be found in this graph. One of the paths is $P = \{r, e'_8, e'_5, e_5, e_1, e'_1\}$. Doing $J \Delta P$, the new J is obtained as $\{e_2, e_3, e_4, e_5, e'_6, e'_7, e'_1, e'_8\}$, which is set of two disjoint spanning trees as illustrated in FIG. 5. As mentioned before, $J \Delta \{e1, f1, \ldots, em, fm, em+1\}$ is defined as $J \cup \{e_1\} \setminus \{f_1\} \ldots \setminus \{f_m\} \cup e_{m+1}$.

7.1.2 Shortest Path Heuristic (SPTH)

As described in Section 6, the set of all paths in the graph along with a quantity called the cost of each path is called the cost function of the graph. The Dijkstra algorithm takes the cost function and incidence matrix of the graph as inputs and computes the shortest path tree from a given source to the given set of receivers.

In this scheme, the first tree, T1, is obtained using the Dijkstra algorithm; i.e., T1 is the shortest path tree from the source to the set of receivers. The cost function of the graph is modified after computing the first tree in the following manner—cost associated with paths used in T1 is increased by an amount called Link Weight and the cost associated with paths which share a common node with T1 is increased by an amount called Node Weight. T2 is computed using the original incidence matrix of the graph and this new cost function. Since the Dijkstra algorithm tries to use paths of the lowest cost, this way of modifying the cost function discourages use of the paths already used in T1 or the paths with a common node with T1 (the extent of the discouragement depends on the values of the parameters Link Weight and Node Weight). Computation of subsequent backup trees is carried out (in a manner similar to the computation of the second tree) by discouraging the use of links and nodes already used in previous trees by further modification of cost function, hence allowing nodes used in both trees to be discourage more than nodes used in just one of them.

Shortest Path Heuristic Algorithm

---

```
T1=Dijkstra_Algorithm (G,Cost,Source,Receivers)
Initialize Cost1 to equal Cost for all paths in G
For each edge i in T1
   { Cost1_i = Cost_i + LinkWeight }
For each node in T1
{
   For each link in G which is incident on this node in T1
      { Cost1_i = Cost_i + NodeWeight }
}
T2=D(G,Cost1,Source,Receivers)
```

---

7.1.3 Low Cost Heuristic (LCH)

The Low Cost Heuristic algorithm is designed to reduce the total number of transmissions in the multicast trees. The idea is that a single channel wireless network is a broadcast channel, i.e., when a node transmits a packet all of its neighboring nodes can receive it. Hence to minimize resources used, the total number of transmissions required to send data over the multicast tree should be reduced. To achieve this objective, in the Low Cost Heuristic, each of the trees is constructed path by path. Computation of a tree given an initial cost function is done in the following way—a path to a node is computed, cost function is modified and then path to next node is computed and added to the partial tree already constructed and so on.

The modification of the cost function in between computing paths to each receiver is done in such a way as to encourage use of a minimum number of additional transmissions; i.e., if a link already carries the multicast data, its transmission cost is decreased to a very small value. There will be several links outside the current partial tree with this property, because of the broadcast nature of ad hoc networks.

The cost function taken at the beginning of computation of the second tree is a modified version of the original cost function of the tree done in order to discourage use of links and nodes already used in prior trees (for details of modification look at the description in Shortest Path Heuristic). Computation of subsequent backup trees is carried out by discouraging use of links and nodes already used in previous trees by modification of the cost function.

Low Cost Heuristic Algorithm

---

```
Initialize Cost' to Cost
For each receiver j
{
   P_J =D(G,Cost', Source,j)
   For each edge in P1 ⊕ ... ⊕ P_J
      {Cost'_1 = 0}
   For each node in P1 ⊕ ... ⊕ P_J
   {
      For each link in G which is incident on this node in P1 ⊕ ... ⊕ P_J
         {Cost'_1 = ε}
   }
}
T1 = P1 ⊕ P2 ⊕ ... ⊕ P_N
Initialize Cost1 to Cost
For each edge i in T1
   { Cost1_i = Cost_i + LinkWeight }
For each node in T1
{
   For each link in G which is incident on this node in T1
      { cl_i = c_i_ + NodeWeight}
)
Initialize Cost' to Cost1
For each receiver j
{
   P'_J=D(G,Cost',Source,j)
   For each edge in P'1 ⊕ ... ⊕ P'_J
      { Cost1_1 = 0 }
   For each node in P'1 ⊕ ... ⊕ P'_J
   {
      For each link in G which is incident on this node in P'1 ⊕ ... ⊕ P'_J
         { cl_1 = ε }
   }
}
T2 = P'1 ⊕ P'2 ⊕ ... ⊕ P'_N
```

---

7.2 Computing Backup Paths with the Independent Path Algorithm (IPA)

As discussed previously, a more preferred technique for implementing the invention is to calculate backup paths instead of backup trees. The Independent Path Algorithm is an example of an algorithm that computes trees such that paths to each receiver in these trees are disjoint, while allowing paths to different receivers to overlap across trees. Again, it will be understood that this algorithm is exemplary and that the alternate path version of the invention is not limited to use with this specific algorithm. The problem with using trees as backup is that even if just one link in the tree fails, the whole tree needs to be replaced by another, when most of the first tree may be intact. Instead, using the Independent Path Algorithm, one starts off with a tree and then for each receiver, the algorithm computes a set of backup paths which are maximally disjoint from one another and from the path to the receiver in the first tree.

The first tree can be computed using either the Dijkstra algorithm or using the Low Cost Heuristic (if cost is critical). For each receiver, a path independent of the original path to the node in the first tree is computed by modifying the cost function (as in the Shortest Path Heuristic) in order to discourage use of already used nodes and paths.

This method differs from the backup tree methods not only in that it replaces only the damaged part of the tree (local repair) but also in that the backup path to any given receiver can overlap with the rest of the first tree (apart from what is being used to transmit data to that receiver). It is more likely to find paths independent from a given path rather than one independent from a given tree. As in the previous two methods, computation of subsequent backup trees is carried out (similar to the second tree) by discouraging use of links and nodes already used in previous trees by modifying the cost function.

Independent Path Algorithm

---

```
T1=D(G,Cost,Source,Receivers)
Initialize Cost1 to equal Cost
For receiver node k
   {
      For link i in path (in T1) to node k
         { Cost1_i = Cost_i + Link Weight }
      For each node in path (in T1) to node k
      {
         For each link in G which is incident on this node in T1
            { cl_i = c_i + Node Weight }
```

-continued

```
    }
    Backup Path to k=D(G,Cost1,Source,k)
  }
}
```

8. Criteria Used for Performance Comparison

The algorithms that are employed in the various embodiments of the present invention were evaluated using simulations for a number of performance criteria, which are discussed in this section.

A. Cost

A number, cost $c_1$, is associated with each link i in the graph. As in traditional networks, it could be chosen to be inversely proportional to the link capacity, proportional to the current load on the link, the delay of the link, etc, or some combination of these parameters. Hence it changes with changes in the network, such as congestion. For example, the cost of a failed link is infinite. The choice depends on what one would like to minimize while communicating information in a given multicast group.

The cost of a tree is defined as the sum of the costs of all the links in the tree. The cost of a set of trees is defined as the sum of the costs of all the trees in the set. For a given multicast group size, the average cost of a scheme is the weighted average of the cost of all the trees being computed, weighted by the average amount of time each of the trees is being used.

B. Dcost

The idea behind defining Dcost is that in a single channel wireless network, the MAC layer is naturally of broadcast type. In other words, when a node transmits, all its neighbors are able to listen to it. Hence the cost of transmission of information to all neighbors from one node is the same as the cost of transmission to the most "expensive'" neighbor. To find Dcost, the tree graph T is divided into many trees $T^j$ with the following property—if an edge i belongs to $T^j$ for some j, all paths in T with the same origin node as i (denoted by $O_j$) also belong to $T^j$ and all other edges belonging to $T^j$ have the origin node $O_j$. With each $T^j$ we associate a number $dc_j$ which is $\{max\ c_1 : i \in T^j\}$. The Dcost of the tree T is then defined as $\Sigma_j dc_j$. The Dcost of a set of trees is defined as the sum of Dcosts of the trees in the set.

Just as in the case of cost, the average Dcost of a scheme is the weighted average of the Dcost of all the trees being computed, weighted by the average amount of time each of the trees is being used.

C. Time of Failure or Mean Time Between Interruptions

Time of failure of a tree is the minimum time by which at least one of the links of the tree fails and the time of failure of the system is the minimum time at which all paths, (in the first and the backup trees) to at least one of the multicast receivers fail.

The terms, system time and the mean time between interruptions, are used interchangeably since an interruption occurs whenever there is a failure of all the trees triggering re-computation of trees.

D. Probability of Usefulness

The probability that the backup set computed by any of the above schemes will be used is defined as the probability of usefulness. It is that fraction of the total number of trials for which failure time of the system is greater than failure time of the first tree.

E. Increase in Mean Time Between Interruptions

The increase in mean time between interruptions due to backup is $T_{system} - T_{tree1}$. Here $T_{system}$ is the time of failure of the system and $T_{tree1}$ is the time of failure of tree 1.

9. Simulation Results and Discussion

A number of simulation experiments were conducted to evaluate the performance of the four techniques (MIA, SPTH, LCH, IPA) employed in the preferred embodiments to calculate backup trees and paths. Overall, it was found that the IPA gives much better performance than the others with very small increase in transmission cost of the multicast trees. A more detailed discussion of the results follows.

For one backup tree, the average cost of trees used was not very different for the various schemes. However, the average number of transmissions required per packet, the Dcost, was found to be significantly higher for the Matroid Intersection Algorithm, while the Dcost curves for the other three schemes were relatively bunched together. This is because of the fact that the Matroid Intersection Algorithm, in the process of making the two spanning trees path disjoint, causes links incident on any given node to be distributed among the two spanning trees. Hence, there is a lower number of links incident on any given node in each of these spanning trees when compared to the whole network. Because of this, each multicast tree has a smaller number of outgoing links to choose from at each node and hence has a larger number of transmissions.

If one were using just one tree, it would be expected that the mean time between interruptions would be reduced with an increase in the multicast group size. This is so, since the increase in multicast group size increases the size of the tree and hence increases the probability that at least one of the links fails by any given time. However, while using backups, the total time for which the system lasts may increase with an increase in the multicast group size due to an increase in the probability of usefulness. This is because even though the first tree fails faster, the backup trees are available more often, hence increasing the total time (on an average) for which the set of trees lasts. In terms of the mean time between interruptions and increase in it due to use of backup, the schemes can be ranked in the following order: IPA, MIA, LCH and SPTH with the IPA performing best. The two trees in LCH are expected to have greater independence than in the SPTH, because by encouraging several links from one node to be included in the first tree, the tree is made to occupy a smaller "area," hence leaving greater space for the other tree to be formed without having to overlap with the first one.

MIA ensures that the trees are almost path disjoint, by computing the two trees simultaneously while the SPTH and LCH compute the first tree before the second one, hence losing out on the possibility of combined optimization. IPA lasts much longer than other schemes, especially for larger multicast groups, because of the fact that it includes local repair. Firstly, since independence means that the two paths to each receiver are independent of one another, the average dependence does not increase much with size of the multicast group like the other schemes. Secondly, since local repair is implemented, if one part of first tree and one part of the second tree have failed, the system can still be working by some combination of the two trees, hence increasing the system time.

The probability of usefulness was found to decrease with the increase in dependence between the two trees. For the tree based algorithms, dependence between the two trees increases with the increase in multicast group size, because each tree occupies more "area." On the other hand, as the size of a tree increases, its failure time decreases. For this reason, given that the first tree fails, it is very likely that the rest of the network is intact and hence the second tree is intact with higher probability. These opposing factors were noted especially in the case of SPTH. On the other hand, the LCH curve did not change much, because the two factors balanced each other out. In the case of MIA the two trees are almost path disjoint, irrespective of the size of the group and hence only the second factor dominates. The same is true for the IPA because, as described in the previous paragraph, its dependence does not increase much with group size.

Results for two and three backup trees followed the same trends for various parameters as the one backup case with greater improvements in terms of mean time between interruptions, probability of usefulness, and higher cost and Dcost of trees. Using IPA was found to result in a greater increase in mean time between interruptions than SPTH and LCH for any amount of backup used. Surprisingly, it was also observed that for IPA the improvement in time due to third backup tree was greater than the improvement due to second backup tree. This is also true for LCH and SPTH for low multicast group sizes, where dependence between two trees is still low.

The simulations also established that increase in the probability of usefulness decreases with increase in number of backup trees. This is an expected result because with increase in n, the probability that at least one first n−1 backup tree is available along with the nth backup tree at the time of failure of the first tree increases.

The simulations also confirmed, as discussed in Section 3, that maximum independence among the trees does not maximize mean time between interruptions. The simulation in this regard used the Independent Path Algorithm and a 30 node network with node degree of 6 and one backup tree. The Link Weight and Node Weight parameters which regulate the amount of dependence were set equal to each other and varied over the range [1,30]. It was found that increase in the Link Weight/Node Weight increases the average Dcost of trees monotonically and decreases the number of common edges (and hence dependence) monotonically. However, the mean time between interruptions was found to increase first, until a Link Weight/Node Weight value of 2 and then decreased slightly to reach a saturation level. This illustrates the trade off between dependence of a pair of trees and the total time for which at least one of them lasts. Hence, the principles of the present invention perform best when some dependence is allowed among the set of trees by choosing a relatively moderate value for the Link Weight and Node Weight parameters in the tree computation algorithms.

10. Conclusion

The use of multiple backup trees or paths in the various embodiments of the present invention that are available for immediate replacement of failed trees or paths provide the multicasting operation in an ad hoc or other networks with a working backup infrastructure having high probability without much extra expense in terms of cost of the trees or computation or data collection. Each of the exemplary algorithms employed in the preferred embodiments seeks to provide an optimal level of independence that allows for maximum mean time between interruptions. In addition, timely update of the backup tree or path set before actual failure of a current tree set is preferably employed in the various embodiments of the present invention to keep the probability of interruption below a desired value.

Although the invention has been disclosed in terms of a number of preferred embodiments and variations thereon, it will be understood that numerous other variations and modifications could be made thereto without departing from the scope of the invention as defined in the following claims.

What is claimed is:

1. A method of operating a multicasting communications network comprising the steps of:
   a) providing a multicasting communications network formed of a plurality of nodes and links connecting said nodes to facilitate communication among said nodes;
   b) calculating a first multicast routing scheme, said multicast routing scheme defining, for each of said nodes, a plurality of paths for facilitating communication with each of said other nodes in said network, said paths each being formed by one or more of said links;
   c) calculating one or more alternate multicast routing schemes to be employed if said first multicast routing scheme fails due to failure of one or more of said links or nodes;
   b) implementing multicasting communications between said nodes in said network by interconnecting said nodes in accordance with said first multicast routing scheme; and
   d) interconnecting said nodes in accordance with one of said alternate multicast routing schemes if said first multicast routing scheme fails;
   e) estimating a time at which a probability of said one or more alternate multicast routing schemes failing exceeds a predetermined threshold;
   f) employing said estimated time to determine a time at which calculation of one or more additional alternate multicast routing schemes should begin; and,
   g) calculating one or more additional alternate multicast routing schemes at said determined time.

2. The method of claim 1, wherein said first multicast routing scheme comprises a first set of routing trees that define how each of said nodes is connected to one or more of said other of said nodes using said links, and said one or more alternate multicast routing schemes comprise one or more set of backup trees.

3. The method of claim 2, wherein said sets of alternate multicast backup trees are calculated using an algorithm that maximizes the independence of said alternate multicast trees relative to said first set of multicast trees by minimizing the number of said nodes and links that are employed in said first set of trees.

4. The method of claim 1, wherein said first multicast routing scheme comprises a first set of multicast routing trees that define how each of said nodes is connected to one or more of said other of said nodes using said paths, and said alternate multicast routing schemes comprise one or more sets of backup paths to be used if one or more of said paths in said first set of multicast routing trees fails.

5. The method of claim 4, wherein said one or more sets of backup paths are calculated using an algorithm that maximizes the independence of said backup paths relative to the paths employed in said first set of multicast trees.

6. A multicasting communications network comprising:
   a) a plurality of communications nodes; and
   b) a plurality of links connecting said nodes to facilitate communication among said nodes;
   wherein, each of said nodes includes:
   1) a transceiver for receiving communications from and transmitting communications to other of said nodes in said network 2) a processor for controlling operation of said transceiver, said processor being programmed to calculate a first multicast routing scheme, said multicast routing scheme defining, for each of said nodes, a plurality of paths for facilitating multicast communication with each of said other nodes in said network, said paths each being formed by one or more of said links, and one or more alternate multicast routing schemes to be employed if said first routing scheme fails due to failure of one or more of said links or nodes; said processor also being programmed to estimate a time at which a probability of said one or more alternate multicast routing schemes failing exceeds a predetermined threshold, employ said estimated time to determine a time at which calculation of one or more additional alternate multicast routing schemes should begin, and calculate one or more additional alternate multicast routing schemes at said determined time; and 3) a database for storing said first and one or more alternate multicast routing schemes.

7. The network of claim 6, wherein said first routing scheme comprises a first set of multicast routing trees that define how each of said nodes is connected to one or more of said other of said nodes using said links, and said one or more alternate multicast routing schemes comprise one or more set of backup trees.

8. The network of claim 7, wherein said processor is programmed to calculate said sets of alternate backup multicast trees using an algorithm that maximizes the independence of said alternate multicast trees relative to said first set of multicast trees by minimizing the number of said nodes and links that are employed in said first set of multicast trees.

9. The network of claim 6, wherein said first routing scheme comprises a first set of multicast routing trees that define how each of said nodes is connected to one or more of said other of said nodes using said paths, and said alternate multicast routing schemes comprise one or more sets of backup paths to be used if one or more of said paths in said first set of multicast routing trees fails.

10. The network of claim 9, wherein said processor is programmed to calculate said one or more sets of multicast backup paths using an algorithm that maximizes the independence of said multicast backup paths relative to the paths employed in said first set of trees.

11. The network of claim 6, wherein said network is an ad-hoc network.

\* \* \* \* \*